(12) United States Patent
Stalker

(10) Patent No.: US 10,110,003 B2
(45) Date of Patent: Oct. 23, 2018

(54) ENERGY OPTIMIZATION SYSTEM

(76) Inventor: James R. Stalker, Las Cruces, NM (US)

(*) Notice: Subject to any disclaimer, the term of this patent is extended or adjusted under 35 U.S.C. 154(b) by 789 days.

(21) Appl. No.: 12/770,982

(22) Filed: Apr. 30, 2010

(65) Prior Publication Data

US 2011/0193423 A1    Aug. 11, 2011

Related U.S. Application Data

(60) Provisional application No. 61/263,911, filed on Nov. 24, 2009.

(51) Int. Cl.
| | |
|---|---|
| G06F 15/16 | (2006.01) |
| H04L 12/66 | (2006.01) |
| H02M 1/00 | (2006.01) |
| H02J 9/00 | (2006.01) |
| F03B 13/00 | (2006.01) |
| H02J 3/14 | (2006.01) |
| H02J 3/00 | (2006.01) |
| H02J 3/38 | (2006.01) |

(52) U.S. Cl.
CPC .............. H02J 3/14 (2013.01); *H02J 3/008* (2013.01); *H02J 3/382* (2013.01); *H02J 3/383* (2013.01); *H02J 3/386* (2013.01); *H02J 2003/146* (2013.01); *Y02B 70/3225* (2013.01); *Y02E 10/563* (2013.01); *Y02E 10/763* (2013.01); *Y04S 20/222* (2013.01); *Y04S 20/224* (2013.01); *Y04S 50/10* (2013.01)

(58) Field of Classification Search
CPC .................................. G06F 9/46; H04L 67/34
USPC .................................................. 709/227, 229
See application file for complete search history.

(56) References Cited

U.S. PATENT DOCUMENTS

| | | | | |
|---|---|---|---|---|
| 1,903,534 | A | * | 4/1933 | Rime ............................... 416/15 |
| 4,112,292 | A | * | 9/1978 | Varvel et al. ................. 235/449 |
| 5,140,557 | A | | 8/1992 | Yoshida |
| 5,845,282 | A | | 12/1998 | Alley et al. |
| 6,181,984 | B1 | | 1/2001 | Sawa et al. |
| 6,559,552 | B1 | * | 5/2003 | Ha .......................... F03B 13/00 |
| | | | | 290/54 |

(Continued)

OTHER PUBLICATIONS

B. Fortenbery (DC Power for Improved Data Center Efficiency, Mar. 2008).*

*Primary Examiner* — Kevin Bates
*Assistant Examiner* — Emad Siddiqi

(57) ABSTRACT

A system with three distinct but integral aspects for an effective energy optimization solution is disclosed. First, the system comprises a Smart Energy Load Center (SELC) adjacent to an energy generation facility (e.g., a wind farm) to limit or to entirely eliminate energy losses in transit and to reduce transmission and distribution infrastructure costs, and to eliminate energy handling costs reflected in relatively higher retail energy rates, compared to lower wholesale energy rates. Second, the system comprises methods to split existing energy consuming gadgets/gizmos (e.g., personal computers—PCs) into two sets of parts and moves the bigger set of the parts to the SELC without compromising the original functionality of the gadgets/gizmos. Thirdly, the system utilizes the material reduction and increased design features and cost savings yielded by the economies of scale offered by PCs residing at the SELC (Remote PC Warehouse) and harnesses the residual energy contained in the digital information.

8 Claims, 7 Drawing Sheets

(56) References Cited

U.S. PATENT DOCUMENTS

| | | |
|---|---|---|
| 6,925,362 B2 | 8/2005 | Machitani et al. |
| 7,020,586 B2 | 3/2006 | Snevely |
| 7,042,789 B2 | 5/2006 | Bangert |
| 7,089,190 B2 | 8/2006 | Tsui |
| 7,366,011 B2 | 4/2008 | Khitum et al. |
| 7,444,189 B1 | 10/2008 | Marhoefer |
| 7,644,051 B1 | 1/2010 | Moore et al. |
| 8,146,374 B1* | 4/2012 | Zien ................................ 62/101 |
| 2003/0057778 A1* | 3/2003 | Ai ......................... H02H 7/268 |
| | | 307/64 |
| 2006/0075111 A1* | 4/2006 | Auryan .................... G06F 9/46 |
| | | 709/227 |
| 2008/0178032 A1 | 7/2008 | Walrath |
| 2009/0003373 A1* | 1/2009 | Morrissey ............... H04L 12/10 |
| | | 370/445 |
| 2009/0295231 A1 | 12/2009 | Gaffney et al. |
| 2009/0296432 A1 | 12/2009 | Chapuis |
| 2010/0246233 A1* | 9/2010 | Campbell ................. H02J 1/10 |
| | | 363/147 |

\* cited by examiner

ENERGY OPTIMIZATION SYSTEM

CROSS REFERENCES TO RELATED APPLICATIONS

This application is related to and claims priority to a provisional patent application submitted by James R. Stalker, dated Nov. 24, 2009 (App No. 61/263,911).

STATEMENT REGARDING FEDERALLY SPONSORED R&D

Not Applicable.

NAMES OF PARTIES INVOLVED IN THIS INVENTION

James R. Stalker is the sole inventor of this invention.

BACKGROUND OF THE INVENTION

1. Field of the Invention

This invention is related to the field of energy generation from renewable or conventional energy fuel sources and energy consumption in an efficient and optimized manner.

2. Description of the Prior Art

Where energy is generated and where it is consumed are often two different geographic locations today. In other words, consumers expect to use gadgets and gizmos where they live in their homes or where they work at businesses or at places where they manufacture goods and other perishable (e.g., foods) or non-perishable consumer products. The functionality of these gadgets and gizmos is often required at the location of operation. However, within many such gadgets and gizmos in use today (e.g., personal computers, printing presses, etc., to name a few), whose internal parts that consume energy, are not necessarily needed to be present at the location of operation. When energy is transported from the generation facility to the location of operation, there are additional transmission and distribution costs to the consumer, in addition to the costs associated with the energy losses in transmission. Depending on the required transmission distance, such energy available at the location of operation may be considered more (large distances) or less (short distances) inefficient. This type of energy is referred to as the environmentally unsound expensive energy (EUEE) here. Many of the gadgets and gizmos or at least certain parts within them use EUEE, although such parts are not essential to be present at the location of operation to provide the expected functionality. In other words, if those gadgets or gizmos or parts of them are moved adjacent to an energy generation facility, such gadgets and gizmos will use more environmentally sound inexpensive energy (ESIE). ESIE is also defined for the current invention. The central idea behind this invention is about finding ways to reduce EUEE and proportionately increase ESIE. This invention leads to the critically important energy consumption efficiency with global implications.

There is no known direct prior art that describes the specific aspects of EUEE and ESIE disclosed in this application, other than two U.S. patents (U.S. Pat. Nos. 7,4444,189 and 7,089,190) that deal with managing energy within a building and managing utility-scale energy production and dispatch, respectively.

Wind energy generation facilities are used to illustrate the invention, although the invention is applicable for any type of energy generation facility. The U.S. goal to reach 20% of energy production, within the national energy portfolio, from wind by 2030[1] will partly depend on improving energy efficiency of the gadgets and gizmos in use today. Additionally, the wind energy industry faces many significant hurdles before such national goal can become reality. One of those known hurdles results from utility scale wind resource locations usually being much farther away from where the load centers (locations of operation) are located. This hurdle, if overcome, will require very little to no transmission infrastructure costs. In other words, the invention described herein will positively reduce the use of EUEE throughout the world. This energy consumption efficiency aspect of the current invention establishes the potential for global reach just on the technical merits of the invention alone.

Similarly, however, the business aspects of the invention are far reaching, too, and are described with respect to the wind energy sector, although such business aspects are applicable to any other energy sectors.

A utility-scale (large) wind project developer currently needs a power purchase agreement (PPA) from an energy retailer like a utility before proceeding to construct a wind project. This need is proven to be a severe bottleneck for wind project growth as utilities are wary of the unsteady nature of wind energy. With this invention, a project developer needs to either build a 'Remote PC Warehouse' or lease the premises to others who can. In other words, within the current energy environment, utilities tend to control the purchase price of energy produced by wind project owners/operators. This situation is not conducive to aggressive wind project development growth in the U.S. and around the world. The prior art does not show any methods to overcome this critical bottleneck as this invention here. It is important to note that there have been several attempts to date to build energy generation facilities next to existing energy load centers such as cities, manufacturing plants, etc. However, the existing approach does not address the problem resulting from the fact that the areas adjacent to the existing energy load centers of today are not necessarily known to possess the best naturally available renewable energy resource. The current invention solves this critical problem by creating Smart Energy Load Centers by building energy generation facilities exactly where the most abundant renewable energy resource (e.g., wind) is available. This important distinction must be made between energy load centers of today and the Smart Energy Load Centers of tomorrow resulting from this invention.

Currently, energy consumers are often given very few choices to buy their energy from. In other words, if consumers live within a region served by a utility offering high energy prices, those consumers do not have an option to buy energy from elsewhere. With this invention, energy consumers will pay local energy prices, where the energy generation facilities are located and not the prevailing energy prices of the region they live and work in, no matter where they live in the world. This aspect of the invention leads to global energy "deregulation" to an extent and there is no prior art to offer such low cost energy options for consumers.

With this invention, energy consumers can be presented with a myriad of choices. For example, in the context of a personal computer (PC) as the gadget of consideration, energy consumers can own a PC or lease it or rent it or own multiple PCs at a 'Smart Energy Load Center (SELC)' or at multiple SELCs or own hundreds of PCs (e.g., by a corporation). The traditional PC is divided into two parts in this invention and that part that consumes significant energy is moved to a SELC. The separation of parts, with the preservation of the originally intended PC functionality, is enabled by internet based access of the second part. There is prior art describing remote computer desktop as disclosed in for example, U.S. Pat. No. 5,845,282.

Because of the high natural variability in wind energy availability at any location, wind energy is not considered dispatchable or a reliable energy source. Wind farms can install energy storage systems to make wind energy more dispatchable but such storage systems will increase the total cost of energy production significantly. PCs have individual power supply units (or energy storage systems) and by consolidating all individual power supply units into a large energy storage system, the need for an expensive energy storage system is eliminated at wind farms (energy generation facilities). This invention will help overcome this critical economic bottleneck that has hampered wind project development so far. There is no prior art to directly overcome this economic bottleneck before the current invention.

Many potential wind sites are not chosen for project development now as such sites do not have class 4 or higher wind resource [2] for utility scale wind projects. This current situation does not allow for successfully reaching the national wind energy development goal set forth in [1]. However, with the invention outlined here, even sites with class 2 or 3 wind resource can be economically viable for project development. In other words, utility scale wind resource, as it is known today, is not necessary for establishing large Remote PC Warehouses adjacent to such wind farms. Remote PC Warehouses can be established anywhere in the world (e.g., at onshore sites, in offshore regions, in the upper atmosphere). There is no prior art describing this aspect of wind project development.

The Remote PC Warehouses of this invention in some aspects are similar to known data centers and their designs may be able to use some aspects described in prior art such as U.S. patents (U.S. Pat. Nos. 7,020,586 and 7,644,051).

The residual energy available in the digital information at these Smart Energy Load Centers is part of this invention also. The prior art to attempt to use digital energy has been on the single computer random access memory (RAM) level, described in U.S. patents (U.S. Pat. Nos. 5,140,557, 7,366,011, and 7,042,789).

SUMMARY OF THE INVENTION

This invention is about an energy optimization system that reduces the use of environmentally unsound expensive energy (EUEE) by creating Smart Energy Load Centers (SELCs—i.e., facilities housing both energy generation systems and a plurality of loads employing part of the generated energy) adjacent to where energy is generated, instead of transporting energy to locations of operation. In other words, these systems encourage the use of environmentally sound inexpensive energy (ESIE) in place of EUEE. These systems will greatly facilitate the growth of wind energy development, not only in the U.S. but also around the world, and in developed and developing countries alike. Additionally, these energy optimization systems will be just as applicable with respect to conventional energy generation centers (e.g., coal-fired power plants) as they are with respect to energy generation facilities using renewable energy sources as the fuel such as the Sun, the Earth (geothermal), water bodies (hydropower), biofuels, etc.

This invention is described in terms of how personal computers (PCs) are operated currently and how to build a system that will make the PCs more energy efficient. For example, current PCs contain motherboards, random access memory (RAM), central processing units (CPUs), hard drives (HDs), power supply units (PSUs), and many other peripherals such as CD drives, floppy drives, other data storage systems, etc, packaged into a case. The proposed new PCs will have a monitor, a keyboard, a mouse, and other printing (optional) and storage devices (optional), in addition to a PC Connector Box (part one). The PC Connector Box connects the barebones monitor to customers' own PCs, residing at a Remote PC Warehouse, over the internet. In other words, the remaining parts such as the motherboard, the CPU, the HD, the RAM, etc. will be housed at a remote Smart Energy Load Center, adjacent to an energy generation facility (e.g., a wind farm).

A new, technically sound PC warehousing design to house the second set of parts, is developed as part of this invention. The energy optimization system invented here applies to all gadgets and gizmos that use EUEE now that can be altered to use ESIE instead. In other words, the energy optimization system invented here is not just for PCs alone nor is it for just wind farms alone. Many other gadgets and gizmos can be transformed similarly and whose parts may be moved to other energy generation facilities such as sites utilizing solar energy, geothermal source, etc. for energy fuel.

As part of the invention, a whole new service business model to facilitate "PC", parts, repair service orders will be developed. This service business model will also handle energy billing for energy consumed by individual "PCs" and fulfill the payment collection function.

Another aspect of the invention is about utilizing the unused residual energy, available in digital information, effectively. For example, there is a lot of digital information available at any one instance in the world. And as digital information is nothing but energy, such energy can be utilized, for example, to recharge energy storage systems such as batteries or other capacitor banks. With clustered PCs in one location at a Smart Energy Load Center, harnessing such residual energy becomes easier and yields better economies of scale.

This invention allows for developing data integrity, data security, and data back up features at the Remote PC Warehouses so PC owners can benefit from these features at minimal or no cost to them.

The invention allows a host of auxiliary service offerings such as on-demand PC technical spec upgrades, the ability for PC owners to participate in parallel computing jobs for monetary compensation, and the ability to move the remote PC automatically to different load centers to reduce energy costs, etc. A web interface will be developed where customers can receive these service offerings online.

This invention, through the existence of potentially large clustered PCs, will offer additional benefits in web-related applications. For example, if all the PC servers are available at a single location (Smart Energy Load Center), some of the existing web protocols can be changed for more efficient functionality and/or new ones can be developed altogether to take advantage of the invention.

DETAILED DESCRIPTION OF THE INVENTION

Figure 1A:
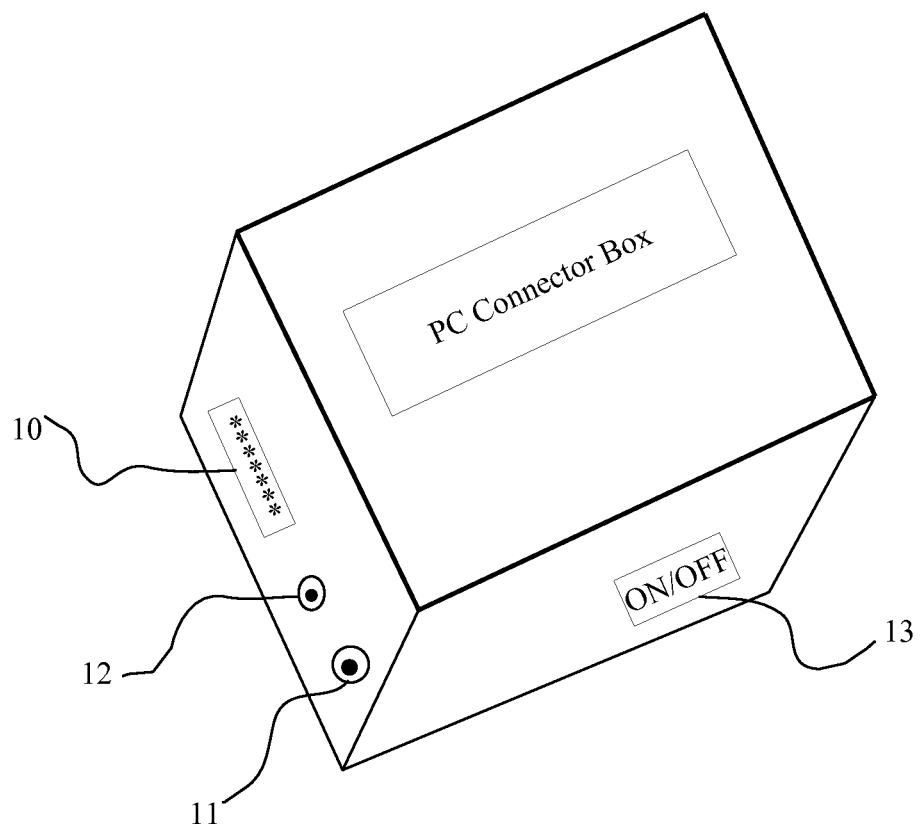
FIG. 1a is a left side view of the PC Connector Box for remotely connecting to the new PC.
Figure 1B:
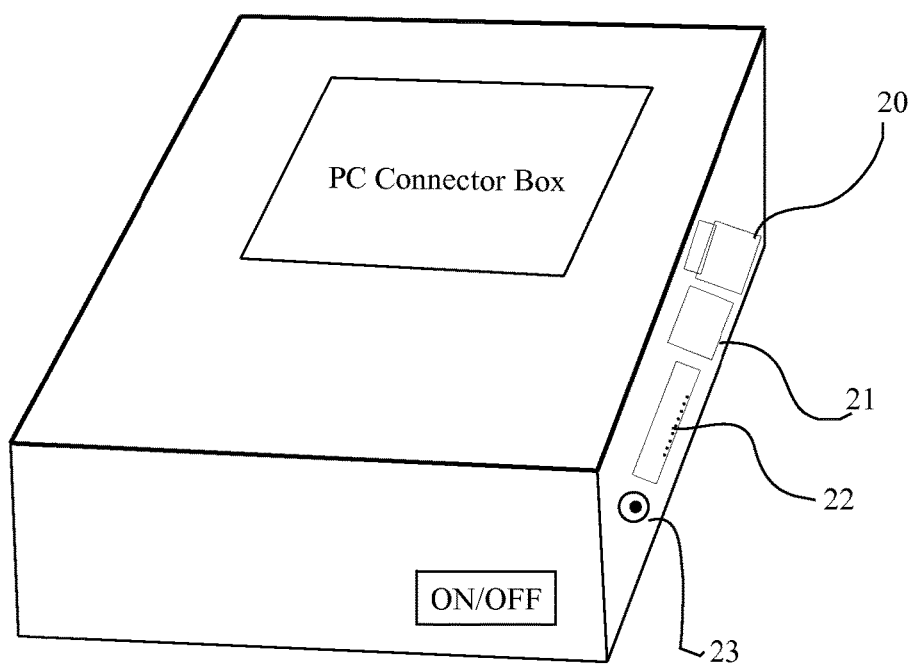
FIG. 1b is a right side view of the PC Connector Box for remotely connecting to the new PC.
Figure 1C:
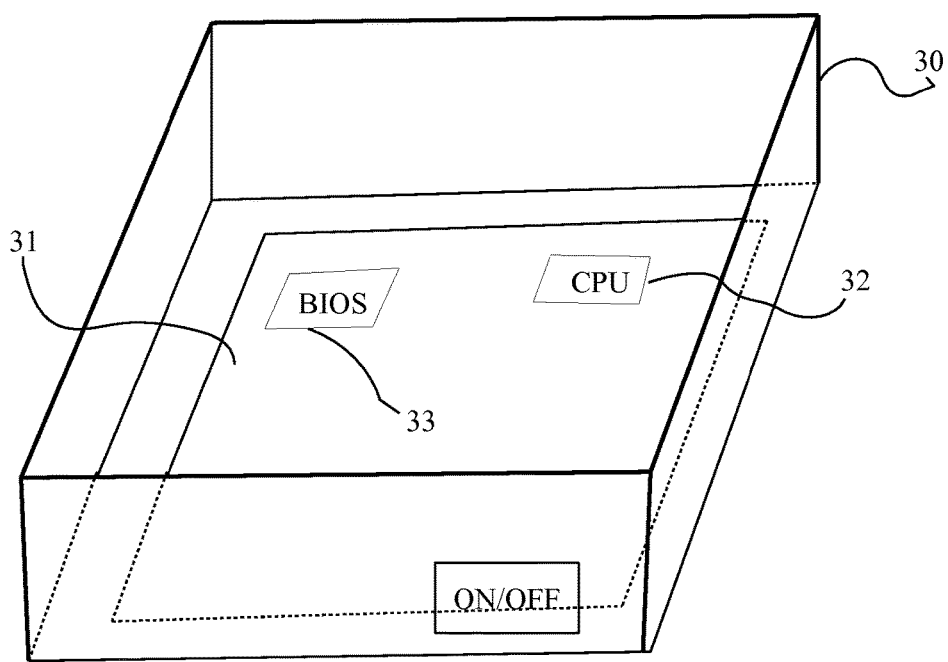
FIG. 1c is a top view of the PC Connector Box for remotely connecting to the new PC.

The traditional personal computer (PC) is strategically separated into two sets of parts. The first set of parts is the PC Connector Box, shown in FIG. 1 (a, b, and c). The main function of the PC Connector Box is to provide the functionality to connect the PC user to the PC box (the second set of parts). Four aspects of the PC Connector Box are shown FIG. 1a. In FIG. 1a, a monitor/VGA port (10), a keyboard port (11), a mouse port (12), and an on/off power button (13) are shown. In FIG. 1b, an ethernet port (20), a universal serial bus (USB) port (21), a printer port (22), and a portable/chargeable battery plug-in (23) are shown. In FIG. 1c, the case (30) to hold these parts together, a miniature motherboard (31), a miniature central processing unit (CPU) (32), and a basic input/output system (BIOS) read-only-memory (ROM) location where lean operating system code resides (33). This PC Connector Box will be able to be connected to the internet, without requiring the usual motherboards that support the connectivity of a number of other components such as hard drives, floppy drives, random access memory (RAM), central processing units (CPUs), cooling fans, etc. Some of these latter components are considered as part of a second set of parts termed the new "PC" (hereafter called the PC or the PC box) in this invention. The PC will be moved to a location adjacent to an energy generation facility. The PC Connector Box is connected to a monitor and a printer at the location where a PC owner uses his/her computer. The PC Connector Box is connected to the PC box at the remote location either via ethernet or wireless connection. Network interfaces are usually available onboard most motherboards or network interface cards (NICs) can be added externally as plug-ins to support this internet connectivity. By separating the PC parts this way, some of the energy consuming PC parts (contained within the new PC box) are moved to the energy generation facility to reduce the total amount of EUEE consumed. As part of the current invention, highly compact motherboard-like circuit boards (31) will be developed or adopted from existing technologies for the network connectivity as part of the PC Connector Box. As mentioned before, internet connection can be achieved via ethernet and/or wireless mode. Redundant internet connection strategies may be implemented to reduce or eliminate PC access downtime. The separation strategy disclosed herein to reduce the overall system usage of EUEE, in the context of the personal computer, is just one example of numerous other gadgets and gizmos that may lend themselves to the application of this invention.

Other available technologies such as routers, etc. may also be integrated into this development effort of compact and cost-effective PC Connector Boxes as appropriate. The R&D effort will include both hardware and software component selection and integration for optimal functionality and cost. Prototyping effort will be undertaken as part of the overall R&D effort. Mass production of these PC Connector Boxes will take place after a proven prototype is built successfully. A large industry partner may be sought to engage in manufacturing large quantities of the PC Connector Boxes.

A first generation PC Connector Box will be tied to a specific PC residing at the Remote PC Warehouse. Customers will buy the PC Connector Box along with the PC box to be installed at a remote location. The PC Connector Box may be for home use or can be portable as well with a miniature version of the PC Connector Box thereby the need for laptop computers is totally eliminated. The multi-purpose utility of the new PC with respect to a portable PC is also part of the invention. After successfully making the connection between the PC Connector Box and the PC, the PC users are ready to access their remote PCs for all applications such as desktop publishing, sending emails, surfing the internet, programming, etc. as if it is a regular PC sitting on their desk at home or at the office or when they are on the road. These PC Connector Boxes will provide the convenience, for example, for hotels to offer a compatible monitor to their guests for easy access to customers' own PCs while on the road. Guests will have access to their own remote PCs in the comfort of their own hotel rooms or at other public places such as airports, etc.

A second generation PC Connector Box will be made generic enough in that PC users can get keycards similar to credit cards to insert into any PC Connector Boxes to access any remote PCs programmed onto those keycards. This way, PC users will only have to carry their keycards while traveling and as soon as they find a PC Connector Box (for example, at airports), they insert their keycards to have instant access to their own remote PCs, without having to carry their PC Connector Boxes. This second-generation PC Connector Box technology with keycards will make it significantly easier to encourage universal adoption of the invention. These keycards may also be used to pay for the energy use as credit cards.

Third-generation PC Connector Boxes will allow customers to program many PCs onto a single keycard. On the keycards, remote PCs are identified by the unique account numbers or account holders' names. With the password provided to individual computer users, the third-generation PC Connector Box will make it easier for PC users to access multiple remote PCs, available elsewhere in the world. More importantly, the new keycards will be made to function as modern credit cards or existing credit cards may be enabled with the capability to access PCs. In other words, a customer can insert a keycard into a PC Connector Box and can pay for the energy charges with the same keycard as well.

Figure 2:
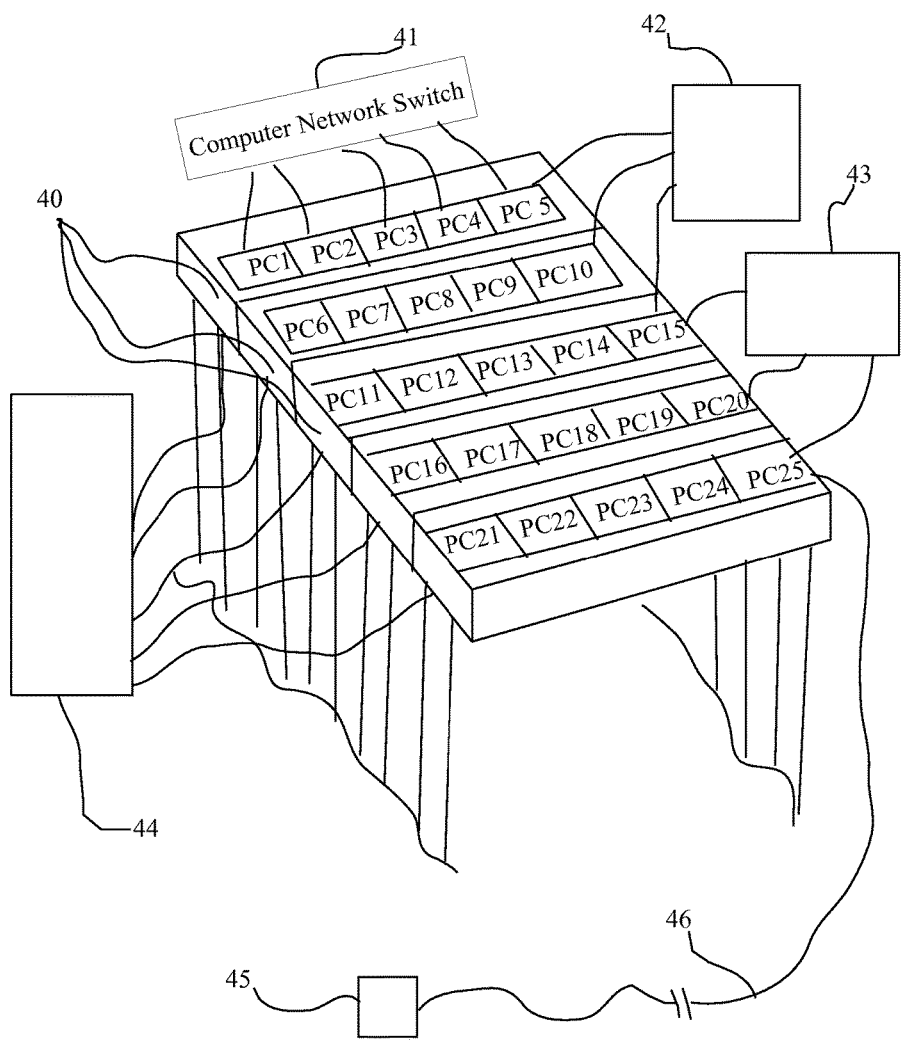
FIG. 2 shows a PC Warehouse configuration at the smart energy load center.

FIG. 2 shows a schematic of a first-generation PC Warehouse design. In FIG. 2, the new PCs are installed on movable custom platforms (40). These movable platforms allow easy access to individual PCs for repairs, upgrades, etc. Each of these new PC stacks will have a custom computer network switch (41), an energy monitoring system (42), and monitoring system to indicate PC health (43), and a large Power Supply Unit (44) that can also act as an energy storage system. The PC user connects to his/her remote PC with the help of the PC connector box (45) via an internet connection (46). Such internet connection can be established based on cables or in wireless mode or as a combination of the two types. Considerable R&D effort may be needed to design and optimize the way individual PC parts such as RAM, CPU, etc. are installed onto the motherboards at the Remote PC Warehouse. Questions such as 'Should these remote PCs contain individual motherboards or should they use a shared motherboard to take advantage of the economies of scale?' will be answered from these future product R&D efforts. Additionally, existing RAM and CPU technologies can be upgraded so that such parts may be able to share other available resources with the remaining PC users/owners from the economies of scale available. For example, a large Power Supply Unit to power all new PCs in the first-generation warehousing design is one such benefit resulting from the economies of scale. The individual PCs will have energy monitors for billing purposes as shown in FIG. 2 (42). The first-generation PC warehousing design can be developed quickly from existing PC technology.

This invention will change the way PCs are bought and sold today. Customers will buy a PC Connector Box starter kit from a designated business that sells PC slots at a Smart Energy Load Center of their choice. Once they establish a PC account, then the load center is informed of the purchase, along with the exact specs the customer wants for their PC. The Smart Energy Load Center will have various PC kits in their warehouse or have the ability to locate PC kits and install the PCs onto the load center motherboards. Installation should be completed within a designated amount of time like twenty-four (24) hours.

The PC customer chooses the operating system (OS) and any add-on software packages he or she desires. OEM vendors will license their software to the warehouse business either on per-PC basis or for the entire Smart Energy Load Center as a multi-seat license.

The customer gets notified when the remote PC is ready for use. The customer plugs in the PC Connector starter kit to a barebones monitor system and the internet. The PC Connector Box will allow wireless access to the internet as well. Customers will get basic tech support but will have the option to buy premium tech support options. Customers may exchange the old PC parts for new PC parts at a cost or may opt to receive the old parts as they desire. New PCs or PC parts may be bought at a wholesale rate available to PC Warehouses.

Figure 3:
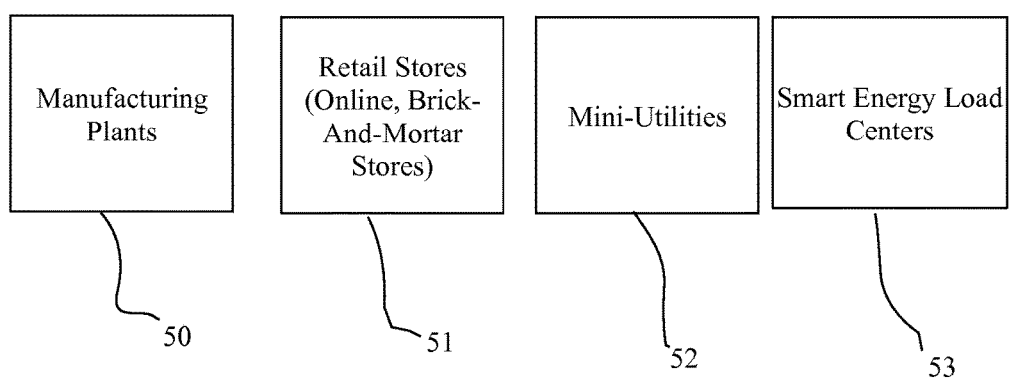
FIG. 3 shows four different business models to be used for properly commercializing the invention.

FIG. 3 shows four different business models required to make this invention work properly. The first business model is for the manufacturers that build PC Connector Boxes and supply custom PC parts as shown in FIG. 3 (50). The second business model is for retail stores (both online and brick-and-mortar stores) as shown in FIG. 3 (51). The third business model is about keeping track of energy usage and fulfilling billing and payment collection functions and to act as a mini-utility shown in FIG. 3 (52). This business model is highly compatible for developing franchises. Also, this business may be made compatible with the credit card business model so eventually credit card companies can act as mini-utilities. The fourth business model required is about building and maintaining remote warehousing centers, also called Smart Energy Load Centers, adjacent to energy generation facilities as shown in FIG. 3 (53). This business model is also highly compatible for developing franchises.

Figure 4:
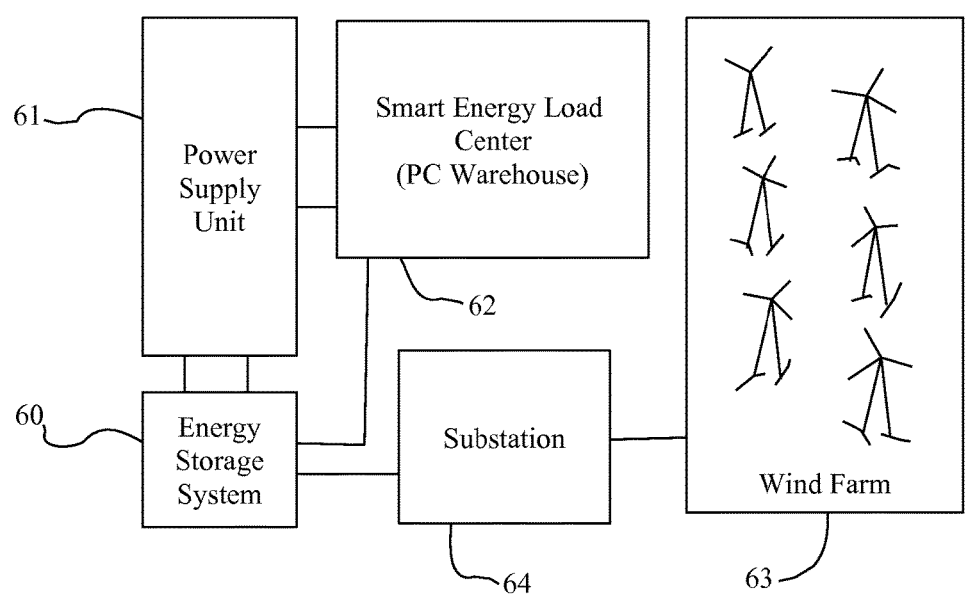
FIG. 4 schematically shows how a single (large) power supply unit can act as an energy storage system critical for operating energy generation facilities fueled from volatile renewable energy sources (e.g., wind and solar farms) but also how the residual energy available in digital information can be harnessed.

FIG. 4 shows a schematic on how the unused (residual) energy can be harnessed to charge an energy storage system (60). Remote PC Warehouses will use a significant amount of energy to create digital information at any instant. This invention recognizes that digital information is energy and any unused digital information or energy can be further utilized. As thousands of PCs reside at Smart Energy Load Centers, the unused energy can be used to charge an energy storage system such as a battery, shown FIG. 4 (60), or recharge the power supply unit, shown in FIG. 4 (61), itself continuously. In some special cases where a large number of PCs are powered at a Smart Energy Load Center, the power supply unit (61) itself can fill the role of an energy storage system (60). Energy storage systems are critically important for wind farms as wind energy source is highly variable and these energy storage systems can help stabilize that wind energy output to a large extent. However, such energy storage systems (60) increase the overall cost of energy for consumers. Because the power supply units (61) implicitly fill the role of the energy storage systems (60) with this invention, the critical need for such energy storage systems is eliminated and the overall cost of energy is reduced. Additionally, the residual energy-harnessing feature is also an important part of the energy optimization system disclosed herein. In other words, the energy storage system capability provided by the large power supply unit to be used for the entire PC Warehouse not only utilizes residual energy, when combined with an energy storage system, but also solves one of the significant issues of variable wind energy availability that stifles aggressive wind project development. The PCs are housed in a PC Warehouse shown in FIG. 3 (62). The energy generation facility, the wind farm, shown in FIG. 3 (63), supplies energy directly to the power supply unit (61) or indirectly through the energy storage system (60) to the power supply unit (61), via a substation shown in FIG. 3 (64). Also under some special circumstances, for example, when the distance between the energy generation facility and the Smart Energy Load Center is negligibly short, the need for a substation can be eliminated thereby the cost of energy is further reduced.

As a large number of PCs are maintained within a Remote PC Warehouse, data integrity, data security, and data backup become important issues. However, these issues can also be economically managed through the economies of scale. Most of such issues can be dealt with, with respect to individual PCs or clusters of PCs, using existing technologies. Such existing technologies will be utilized as much as possible but several new methods to address these issues will be developed as part of this invention. For example, PC "health" monitoring services as well as multiple "mirror" PCs for near 100% up time and data security will be offered. R&D will be performed to develop these services and new standards will be established for these services as the new PC industry is transformed by this invention.

Figure 5:
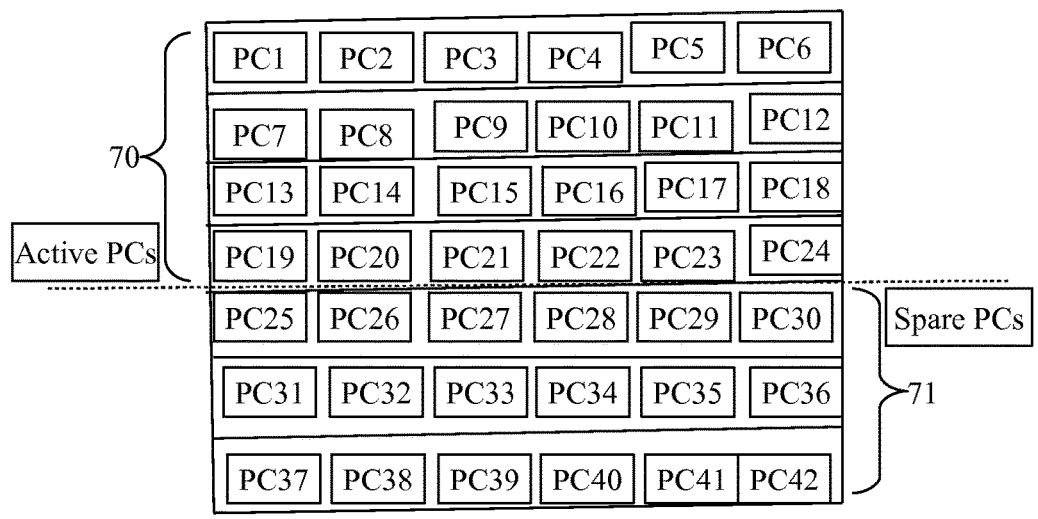
FIG. 5 shows how the current invention can offer instant PC part upgrade via web portal.

FIG. 5 shows a redundant PC Warehouse set up in which PC owners can make instant PC part upgrades online. For example, a PC owner whose PC currently has 512 Megabyte random access memory (RAM), as shown in FIG. 5 (70), can upgrade to 1 Gigabyte RAM, as shown in FIG. 5 (71). Similarly, other part upgrades can be offered by building redundant resources so customers can upgrade some of their PC parts instantaneously online using a web portal to be developed as part of this invention. For example, in addition to the RAM upgrades, other upgrades such as the network speed or the CPU or the motherboard, etc. can be made on the web. Secondly, remote PC Warehouses can offer customers a choice to participate in commercial parallel computing assignments and an opportunity to earn credits to accrue to the keycards and/or for monetary compensation. PC customers may choose to let web hosting service providers use the unused CPU cycles to earn additional credits. Such credits can be redeemed towards energy payments. Thirdly, customers can instantly transfer their remote PCs from one smart energy load center to another, for example, for better energy prices. Eventually, this invention will allow PC customers to manage their remote PC needs and accounts on the web through the web portal to be developed as part of the invention.

This invention allows for many additional web-related features by taking advantage of the large clustered PC servers. Web access to the content residing on the clustered PC servers will be faster and the likelihood of encountering data transfer problems is smaller than when PCs located in geographically diverse areas are involved. For example, a server farm handling certain type of data may yield better web browsing experience than when the individual servers are distributed in geographically diverse locations. Web page access can be improved within next generation web protocols because of such clustered servers, perhaps as part of new web paradigm development efforts.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. An energy optimization system comprising:
    a Smart Energy Load Center (SELC), the SELC comprising:
        a switch and a network router box located within the SELC;
        one or a subset of loads within the SELC associated with a user identifier;
        the one or a subset of loads comprising a plurality of personal or business DC computer systems;
        wherein, the plurality of personal or business DC computer systems share a common power supply and do not comprise individual power supplies;
        the common power supply of the plurality of personal or business DC computer systems are combined with an energy storage facility located within said SELC;
        the energy storage facility utilizes both charging and discharging functionality;
        the energy storage facility stabilizes energy output from unsteady energy input by not using AC/DC converters;
        the energy storage facility is connected to a renewable energy generation facility located within said SELC;
        the renewable energy generation facility is decoupled from an external power grid;
    and a PC connector system, the PC connector system comprising:
        a memory and a processor coupled to the memory, wherein the PC connector system is configured to:
        receive a remote access request by a user based on the user identifier encoded on a keycard;
        sending the remote access request to the switch, via the network router box, located within the SELC, wherein the switch is configured to transmit the remote access request to the network router box located within the SELC;
        the network router box is configured to multiplex between the plurality of personal or business DC computer systems within said SELC and enable access to remotely and instantaneously upgrade the associated load or subset of loads by switching to a different one of the plurality of personal or business DC computer systems.

2. The system of claim 1 wherein the energy generation facility comprises a completely renewable energy facility.

3. The system of claim 2 wherein the energy generation facility comprises an energy generation facility selected from the group consisting of wind, solar, geothermal, tidal wave, and hydroelectric.

4. The system of claim 3 wherein the energy generation facility comprises a wind energy generation facility or a hybrid wind/solar generation facility.

5. The system of claim 1 wherein the Smart Energy Load Center is decoupled from an external power grid to eliminate energy losses in transit and avoid prohibitive transmission and distribution infrastructure costs in energy transportation comprises a plurality of discrete computer systems utilizing direct current without AC/DC converters.

6. The system of claim 5 wherein said SELC comprises a plurality of discrete computer systems comprise a plurality of personal or business computers selected from the group consisting of desktop computers, laptop computers, mobile computing devices, workstations, and servers.

7. The system of claim 1 wherein said network router box provides a remote connection to a personal or business computer based on user identification input.

8. The system of claim 1 additionally comprising a computer network interface for each load in said Smart Energy Load Center.

* * * * *